A. LATIMER.
PNEUMATIC TIRE.
APPLICATION FILED JUNE 8, 1907.
923,279. Patented June 1, 1909.
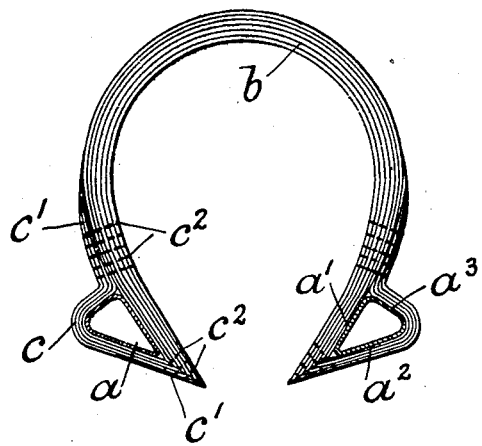
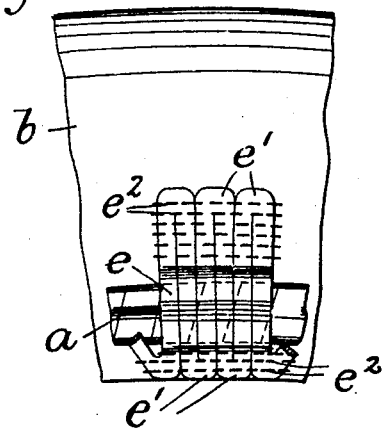
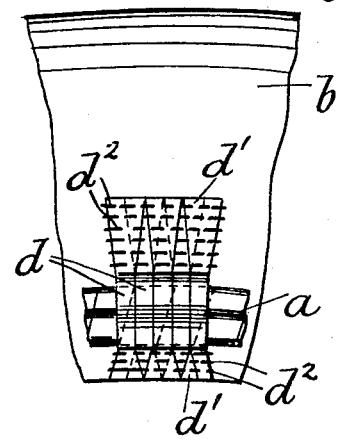
Witnesses. Inventor.

UNITED STATES PATENT OFFICE.

ALEXANDER LATIMER, OF LONDON, ENGLAND.

PNEUMATIC TIRE.

No. 923,279.  Specification of Letters Patent.  Patented June 1, 1909.

Application filed June 8, 1907. Serial No. 377,884.

*To all whom it may concern:*

Be it known that I, ALEXANDER LATIMER, a subject of the King of Great Britain and Ireland, and residing at London, England, have invented a new and useful Improvement in or Relating to Pneumatic Tires, (for which I have filed an application for patent in Great Britain, No. 11,839, dated May 21, 1907;) and I do hereby declare the following to be a full, clear, and exact description of the same.

This invention relates to the beads or thickened edges of pneumatic tire covers which serve for attaching the covers to wheel rims having inturned edges by being forced into said edges, and is particularly applicable to tire covers of large size for motor omnibuses and other heavy road vehicles, and has for its object to provide such covers with external extensible and contractile beads, which can be readily extended, so as to facilitate the lifting of the same over the edge of the wheel rim, and will automatically contract or resile, and will be rigid laterally in engagement with the wheel rim in such manner as not to be liable to be blown out of such engagement.

To this end, the invention consists in forming such beads with cores of close coiled spring steel wire or flat strip spring steel, coiled transversely to the direction of rotation of the wheel rim, and of a triangular shape having sides respectively adapted to fit externally against the tire cover against the wheel rim and into the wheel rim inturned edge, and in securing such core to the cover by flexible means adapted to accommodate the desired extensible and contractile action of the core.

On the accompanying drawings:—Figure, 1, represents a transverse section of a canvas lined tire cover adapted with an extensible and contractile bead according to the invention; and Figs., 2 and 3, are side views showing other ways of securing the extensible and contractile bead to the tire cover.

$a$, represents the extensible and contractile core, which may be coiled entire upon a circular mandrel, or in straight lengths which may be circularly shaped, and riveted or otherwise connected at the ends.

The core has a flat side, $a^1$, adapted to lie against the outer side of the cover, $b$, and angularly disposed sides, $a^2$, $a^3$, shaped to fit against the base and into the inturned edge of the wheel rim it is intended to fit.

The extensible and contractile core may be attached to the cover outer side by rubbered canvas or fabric, $c$, preferably weftless, embracing and holding the core to the cover side, and having its edges, $c^1$, stitched, as at $c^2$, to the rubbered canvas or fabric, $b$, forming the body of the cover, Fig., 1; after which the manufacture of the cover may be completed in a mold or otherwise in a usual manner. Or, the core may be attached to the cover outer side by short lengths of rubbered cord, $d$, placed side by side so as to embrace and hold the core to the cover side, and having their ends, $d^1$, flattened against and stitched, as at $d^2$, to the cover side, Fig., 2. Or, the core may be attached to the cover outer side by a continuous length of rubbered cord, $e$, laid to-and-fro so as to embrace and hold the core to the cover side, and having its bends, $e^1$, flattened against and stitched, as at $e^2$, to the cover side, Fig., 3. Such flexible connections of the extensible and contractile core to the cover side yield so as to allow the beaded edge of the cover to be readily lifted over the edge of the wheel rim, and contract when the pneumatic pressure forces the beads within the inturned edges of the rim, so that the cover is secured to the rim by the engagement therewith of the outstanding extensible and contractile bead in such manner as not to be liable to be blown out of such engagement.

What I do claim as my invention and desire to secure by Letters-Patent is:—

1. An endless core for a beaded-edge for a pneumatic tire cover, said core consisting of a close-coiled metal spring having its convolutions in lateral abutment and made of triangular cross section with an inner flat side adapted to lie against the outer side of the cover.

2. An annular core for a beaded-edge for a pneumatic tire cover said core consisting of a close-coiled spring made of flat steel strip having its convolutions in lateral abutment and made of triangular cross section with an inner flat side adapted to lie against the outer side of the cover.

3. In a beaded-edge for a pneumatic tire cover, in combination, an annular extensible and contractile bead-core consisting of a close coiled metal spring having its convolutions in lateral abutment and made of triangular cross section with an inner flat side and arranged with such side against the outer side of said cover adjacent to one of its edges, and means embracing the core and adapted to accommodate its extension and contraction and serving to secure it in position.

4. In a beaded-edge for a pneumatic tire cover, in combination, an annular extensible and contractile bead-core consisting of a close-coiled spring made of flat steel strip having its convolutions in lateral abutment and made of triangular cross section with an inner flat side and arranged with such side against the outer side of said cover adjacent to one of its edges, and flexible means embracing said core and holding it in position and adapted to accommodate its extension and contraction and secured to said cover at parts adjacent to the respective edges of said side of said core.

5. In a beaded-edge pneumatic tire cover, in combination, an annular extensible and contractile bead-core consisting of a close-coiled metal spring made of triangular cross section and arranged with one side against the outer side of said cover adjacent to one of its edges, cords arranged transversely of and locating said core and adapted to accommodate the extension and contraction of said core, and means securing said cords to said cover at parts adjacent to the respective edges of said side of said core.

6. In a beaded-edge for a pneumatic tire cover, in combination, an annular extensible and contractile bead-core consisting of a close coiled spring made of flat steel strip having its convolutions in lateral abutment and made of triangular cross section with an inner flat side and arranged with such ide against the outer side of said cover adjacent to one of its edges, cords arranged transversely of and locating said core and adapted to accommodate the extension and contraction of said core, and means securing said cords to said cover at parts adjacent to the respective edges of said side of said core.

In witness whereof I have hereunto set my hand in presence of two witnesses.

ALEXANDER LATIMER.

Witnesses:
CHARLES AUBREY DAY.
ALFRED DAY.